US011985253B2

(12) United States Patent
Milam et al.

(10) Patent No.: US 11,985,253 B2
(45) Date of Patent: May 14, 2024

(54) NON-FUNGIBLE TOKEN AUTHENTICATION

(71) Applicant: Pinterest, Inc., San Francisco, CA (US)

(72) Inventors: Evrhet Milam, Las Vegas, NV (US); Tiffany C. Black, San Carlos, CA (US); Ryan Wilson Probasco, San Leandro, CA (US); Will Fu, San Francisco, CA (US); David Temple, Mill Valley, CA (US); Dmitry Olegovich Kislyuk, San Francisco, CA (US); Andrey Dmitriyevich Gusev, San Francisco, CA (US)

(73) Assignee: Pinterest, Inc., San Francisco, CA (US)

( * ) Notice: Subject to any disclaimer, the term of this patent is extended or adjusted under 35 U.S.C. 154(b) by 301 days.

(21) Appl. No.: 17/394,352

(22) Filed: Aug. 4, 2021

(65) Prior Publication Data
US 2023/0043095 A1 Feb. 9, 2023

(51) Int. Cl.
H04L 9/32 (2006.01)
G06F 18/214 (2023.01)
G06N 20/00 (2019.01)
H04L 9/00 (2022.01)
H04L 9/06 (2006.01)
H04L 9/08 (2006.01)
H04L 9/30 (2006.01)

(52) U.S. Cl.
CPC .......... *H04L 9/3247* (2013.01); *G06F 18/214* (2023.01); *G06N 20/00* (2019.01); *H04L 9/0643* (2013.01); *H04L 9/0819* (2013.01); *H04L 9/30* (2013.01); *H04L 9/50* (2022.05)

(58) Field of Classification Search
CPC ....... G06N 20/00; G06F 18/21; G06F 18/214; H04L 9/0643; H04L 9/0816; H04L 9/0819; H04L 9/30; H04L 9/3247; H04L 9/50
See application file for complete search history.

(56) References Cited

U.S. PATENT DOCUMENTS

| 11,341,547 | B1 * | 5/2022 | Lau ........................ G06F 16/215 |
| 2019/0332921 | A1 | 10/2019 | Rodriguez | |
| 2020/0005284 | A1 * | 1/2020 | Vijayan ................. H04L 9/3247 |
| 2020/0242105 | A1 | 7/2020 | Rich et al. | |

(Continued)

OTHER PUBLICATIONS

International Search Report and Written Opinion dated Nov. 14, 2022 in corresponding International Application No. PCT/US2022/038852.

(Continued)

*Primary Examiner* — D'Arcy Winston Straub
(74) *Attorney, Agent, or Firm* — Athorus, PLLC

(57) ABSTRACT

Disclosed are systems and methods that authenticate non-fungible tokens ("NFT") and/or digital data represented by or pointed to by an NFT. In some implementations, authentication may be with respect to an existing NFT. In other implementations, authentication may be with respect to an NFT that is being created. The disclosed implementations may compare a candidate and/or candidate NFT data with existing NFTs and/or existing NFT data to determine if the candidate NFT and/or candidate NFT data is similar to other NFTs and/or other NFT data of another NFT, which may exist on any of many different blockchains.

20 Claims, 11 Drawing Sheets

(56) References Cited

U.S. PATENT DOCUMENTS

2023/0009908 A1\* 1/2023 Castinado ............. H04L 9/0819
2023/0045071 A1\* 2/2023 Kalaldeh .............. G06Q 30/018

OTHER PUBLICATIONS

Martinod, Nicolas et al: "Towards a Secure and Trustworthy Imaging with Non-fungible Tokens", In Applications of Digital Image Processing XLIV, San Diego, California, United States, SPIE, usvol. 11842, Aug. 1, 2021 (Aug. 1, 2021), pp. 1184218-1-1184218-11, XP060146859, ISSN: 0277-786X, DOI: 10.1117 /12.2598436, ISBN: 978-1-5106-4548-6 sections 3-4.

\* cited by examiner

NON-FUNGIBLE TOKEN AUTHENTICATION

BACKGROUND

Non-Fungible Tokens ("NFT"), which are unique (i.e., non-fungible) identifiers (i.e., token) that exist on a blockchain and represent or point to some other data or physical item, or multiple items, like image data, video data, audio data, a physical painting, etc. are increasing in use. Each NFT is assigned to an owner and can be transferred between owners, which is managed by a smart contract. A smart contract is a program that also exists on the blockchain that includes a public/private key pair and can provide, read, and store data, such as ownership transactions, how an NFT is to behave, interactions allowed with an NFT, etc. Because NFTs/smart contracts live on a blockchain, NFTs are trackable, and the history and/or ownership of each NFT can be determined.

However, while the existence of NFTs on a blockchain provide the ability to track the NFT and determine the history and ownership of the NFT, there is currently no way to authenticate that the data represented or pointed to by the NFT is authentic and/or unique to that NFT. For example, there is currently no way for a user to verify that data represented by or pointed to by a first NFT is not also pointed to or referenced by a second NFT, whether that data was created by the same entity that created the NFT, etc.

DETAILED DESCRIPTION

Figure 1:
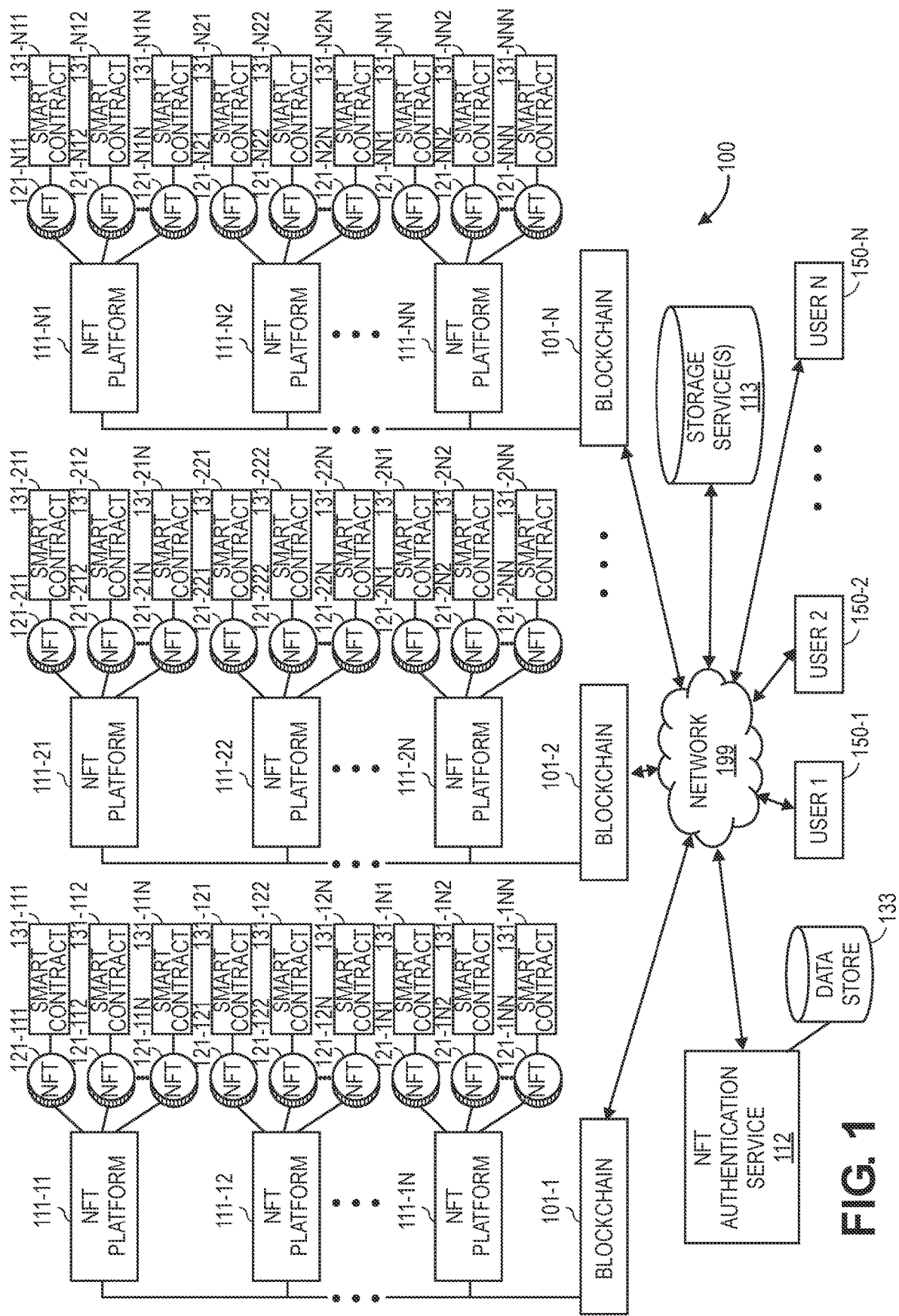
FIG. 1 is an example illustration of an environment that includes non-fungible tokens, in accordance with disclosed implementations.

As discussed further below, the disclosed implementations provide systems and methods to authenticate NFTs and digital data represented by or pointed to by an NFT, referred to herein as NFT data. For discussion purposes, as used herein, an NFT, NFT data, and/or digital data that is being authenticated and/or monitored in accordance with the disclosed implementations are referred to as candidate NFTs, candidate NFT data, and candidate digital data, respectively.

In some examples, the disclosed implementations may be used to authenticate a candidate NFT and/or candidate NFT data of a candidate NFT. For example, as part of an NFT transaction, such as a transfer of ownership of an NFT between a first user and a second user, it may be requested that the candidate NFT and/or candidate NFT data of the candidate NFT be authenticated. As discussed further below, the candidate NFT may be compared to other NFTs to verify that another duplicate NFT does not exist on the same or different blockchain. In addition, the candidate NFT data of the candidate NFT may be determined and compared to NFT data of other NFTs, and optionally to other digital data, to determine the uniqueness of the candidate NFT and corresponding candidate NFT data.

In some examples, a user interface may be presented to a user and/or another entity indicating the determined uniqueness of the candidate NFT, the candidate NFT data, and optionally indicating other NFTs and/or other NFT data that is determined to be similar to the candidate NFT/candidate NFT data. The user and/or other entity may adjust the sensitivity of the determination so that the user may view additional and/or fewer NFTs/NFT data determined to be similar to the candidate NFT/candidate NFT data as part of the authentication.

In other examples, the disclosed implementations may be utilized proactively by a user that is creating or minting an NFT to authenticate the originality or ownership of the NFT and/or the NFT data that is to be represented or pointed to by the NFT that is being created. Again for purposes of discussion, a new NFT and corresponding NFT data that is to be authenticated in accordance with the disclosed implementations is referred to herein as a candidate NFT and candidate NFT data, respectively. For example, a user, as part of the creation or minting of a candidate NFT may request that the candidate NFT and/or candidate NFT data be authenticated as unique to the NFT and/or owned by the user that is creating the NFT. As discussed further below, the candidate NFT that is being created may be compared to other NFTs to verify that another duplicate NFT does not already exist on the same or different blockchain. In addition, the candidate NFT data of the candidate NFT that is being created may be determined and compared to NFT data of other already existing NFTs, and optionally, to other digital data, to determine the uniqueness of the candidate NFT and corresponding candidate NFT data.

In some examples, a user interface may be presented to the user creating the candidate NFT, indicating the determined uniqueness of the candidate NFT, the candidate NFT data, and optionally indicating other NFTs, other NFT data, and/or other digital data that is determined to be similar to the candidate NFT/candidate NFT data. In some examples, if the candidate NFT and/or candidate NFT data is determined to not be unique, the user may update or change one or more aspects of the candidate NFT and/or candidate NFT data to remove or replace the aspects that are determined to not be unique. In some examples, upon authentication of a candidate NFT, the disclosed implementations may generate a record or identifier that can be relied upon by the user and/or other users that the candidate NFT and candidate NFT data of the candidate NFT are unique and authenticated in accordance with the disclosed implementations.

In still other examples, the disclosed implementations may be used by an NFT owner and/or digital data owner to monitor one or more candidate NFTs, candidate NFT data, and/or candidate digital data, whether represented by an NFT or not, such that the user will be notified if another user attempts to or does create an NFT that is a duplicate of the candidate NFT or includes candidate NFT data and/or a candidate digital data.

FIG. 1 is an example illustration of an environment 100 that includes non-fungible tokens, in accordance with disclosed implementations.

As is known, NFTs 121 exist on a blockchain, such as blockchain 101-1, blockchain 101-2, through blockchain 101-N. Currently, most NFTs exist on the Ethereum Blockchain. However, other blockchains, such as Flow Blockchain, Tezos Blockchain, Polkadot Blockchain, etc., also host NFTs.

In addition to multiple blockchains, there are multiple markets or platforms 111 on each of blockchains 101 through which NFTs are created (also referred to as minted), purchased, sold, etc. For example, platforms like OpenSea, Rarible, and Nifty Gateway all operate on the Ethereum Blockchain. In the example network configuration 100 illustrated in FIG. 1, NFT Platform 111-11, NFT Platform 111-12, through NFT Platform 111-1N operate on blockchain 101-1, NFT Platform 111-21, NFT Platform 111-22, through NFT Platform 111-2N operate on blockchain 101-2, and NFT Platform 111-N1, NFT Platform 111-N2, through NFT Platform 111-NN operate on blockchain 101-N.

As illustrated, each NFT Platform 111 may be utilized by users 150-1, 150-2, through 150-N to interact with (e.g., buy, sell, create, access, etc.) one or more NFTs 121. For example, the NFT Platform 111-11 enables interaction with NFT 121-111 and corresponding smart contract 131-111, NFT 121-112 and corresponding smart contract 131-112, through NFT 121-11N and corresponding smart contract 131-11N. NFT Platform 111-12 enables interaction with NFT 121-121 and corresponding smart contract 131-121, NFT 121-122 and corresponding smart contract 131-122, through NFT 121-12N and corresponding smart contract 131-12N. NFT Platform 111-1N enables interaction with NFT 121-1N1 and corresponding smart contract 131-1N1, NFT 121-1N2 and corresponding smart contract 131-1N2, through NFT 121-1NN and corresponding smart contract 131-1NN.

Likewise, on blockchain 101-2, the NFT Platform 111-21 enables interaction with NFT 121-211 and corresponding smart contract 131-211, NFT 121-212 and corresponding smart contract 131-212, through NFT 121-21N and corresponding smart contract 131-21N. NFT Platform 111-22 enables interaction with NFT 121-221 and corresponding smart contract 131-221, NFT 121-222 and corresponding smart contract 131-222, through NFT 121-22N and corresponding smart contract 131-22N. NFT Platform 111-2N enables interaction with NFT 121-2N1 and corresponding smart contract 131-2N1, NFT 121-2N2 and corresponding smart contract 131-2N2, through NFT 121-2NN and corresponding smart contract 131-2NN.

Finally, on blockchain 101-N, the NFT Platform 111-N1 enables interaction with NFT 121-N11 and corresponding smart contract 131-N11, NFT 121-N12 and corresponding smart contract 131-N12, through NFT 121-N1N and corresponding smart contract 131-N1N. NFT Platform 111-N2 enables interaction with NFT 121-N21 and corresponding smart contract 131-N21, NFT 121-N22 and corresponding smart contract 131-N22, through NFT 121-N2N and corresponding smart contract 131-N2N. NFT Platform 111-NN enables interaction with NFT 121-NN1 and corresponding smart contract 131-NN1, NFT 121-NN2 and corresponding smart contract 131-NN2, through NFT 121-NNN and corresponding smart contract 131-NNN.

As is known, NFTs 121 and corresponding smart contracts 131 are stored on blockchains 101. However, often times, the data, such as image data, video data, etc., of an NFT are often stored on storage devices 113 off the blockchain and referenced or pointed to by the NFT. For example, data referenced or pointed to by an NFT may be stored in decentralized storage, such as Interplanetary File System (IPFS).

The different components of the environment 100 are accessible with each other and users through a network 199, which may include in whole or in part the Internet.

The NFT authentication service 112, as discussed herein, may be utilized to authenticate one or more candidate NFTs, one or more candidate NFT data, and/or monitor one or more digital data. As discussed further below, the NFT authentication service 112 may crawl or process each blockchain 101 to determine NFTs 121 and corresponding smart contracts 131 existing on each blockchain, detect creation of new NFTs 121/smart contracts 131, etc., and maintain an index or catalog of all existing NFTs and corresponding smart contracts, for example in a data store 133, that is accessible by the NFT authentication service 112.

Figure 2:
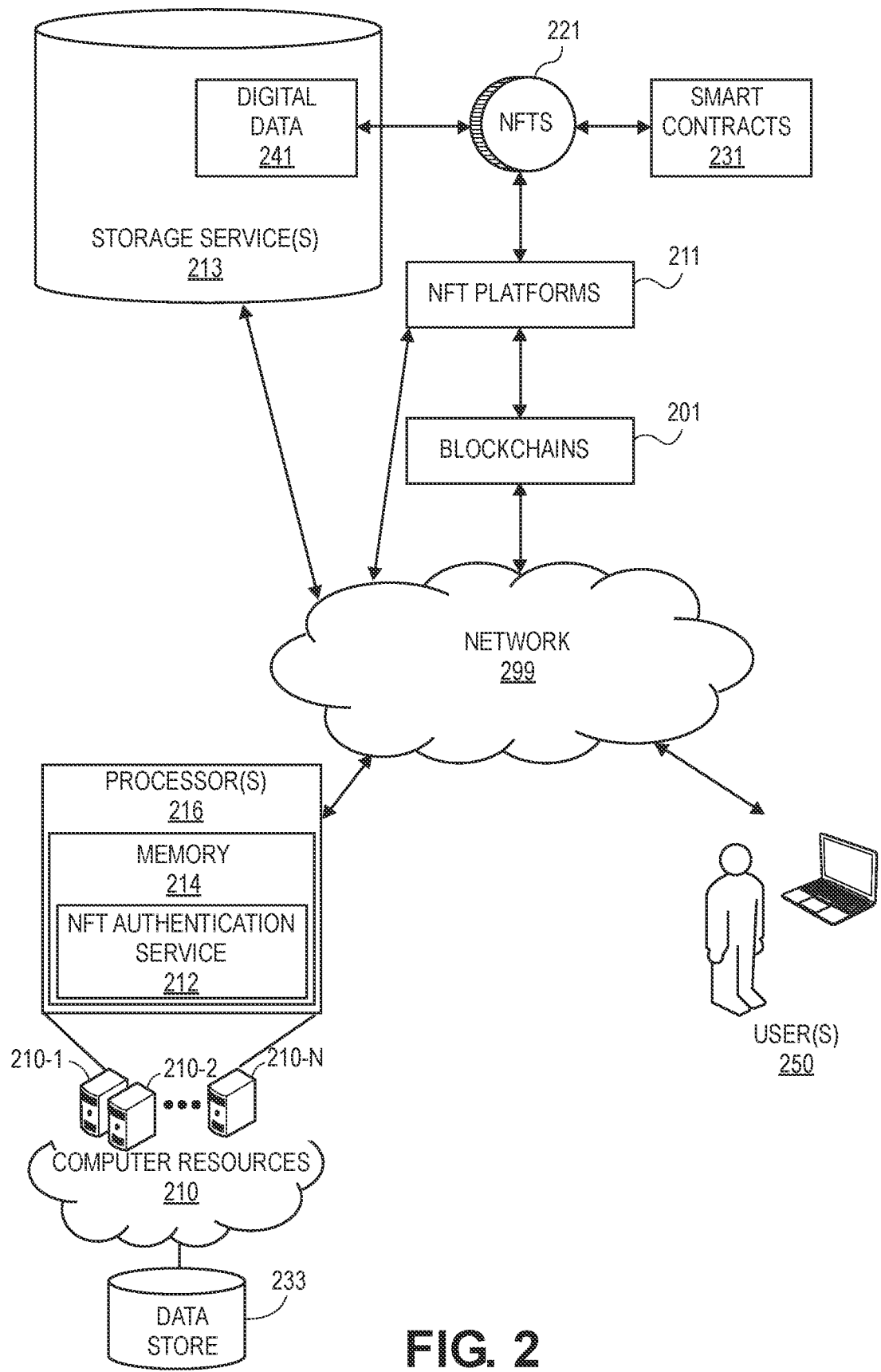
FIG. 2 is an example illustration of a more detailed view of a portion of the environment discussed with respect to FIG. 1, in accordance with disclosed implementations.

FIG. 2 is an example illustration of a more detailed view of a portion of a environment 100 illustrated in FIG. 1, that includes non-fungible tokens 221, the storage service(s) 213, users 250, and the NFT authentication service 212, in accordance with disclosed implementations.

The NFT authentication service may operate on computing resource(s) 210. The computing resource(s) 210 may be configured to communicate over the network 299 with one or more of the user(s) 250, blockchains 201, NFT platforms 211, and/or the storage service(s) 213.

As illustrated, the computing resource(s) 210 may be implemented as one or more servers 210-1, 210-2, . . . , 210-N and may, in some instances, form a portion of a network-accessible computing platform implemented as a computing infrastructure of processors, storage, software, data access, and so forth that is maintained and accessible by components/devices via a network 299, such as an intranet (e.g., local area network), the Internet, etc. The computing resources 210 may include or enable execution of the NFT authentication service 212 that may process NFTs 221, smart contracts 231, digital data 241, etc. The server system(s) 210 does not require end-user knowledge of the physical location and configuration of the system that delivers the services. Common expressions associated for these remote computing resource(s) 210 include "on-demand computing," "software as a service (SaaS)," "platform computing," "network-accessible platform," "cloud services," "data centers," and so forth. Each of the computing resources 210-1-210-N include one or more processors 216 and a memory 214, which may store or otherwise have access to the NFT authentication service 212, as described herein. An example configuration of a computing resource 210 is discussed further below with respect to FIG. 10.

The network 299 may utilize wired technologies (e.g., wires, USB, fiber optic cable, etc.), wireless technologies (e.g., radio frequency, infrared, NFC, cellular, satellite, Bluetooth, etc.), or other connection technologies. The network 299 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

As discussed further below, the NFT authentication service 212, executing on the computing resources 210, may determine NFTs 221 and smart contracts 231 existing on each of the blockchains 201 and process those NFTs 221/smart contracts 231 to establish an index of NFTs/smart contracts that the NFT management service may maintain on a data store 233 accessible to the NFT authentication service 212. In addition, as discussed herein, the NFT authentication service 212 may process NFTs 221/smart contracts 231 to determine one or more digital data 241 that are maintained in a storage service 213 and referenced by or pointed to by an NFT 221. As discussed, the NFTs 221, smart contracts 231, and digital data 241 may be processed by the NFT authentication service 212 in accordance with the disclosed implementations to authenticate a candidate NFT, candidate NFT data, and/or for monitoring of digital data.

Figure 3:
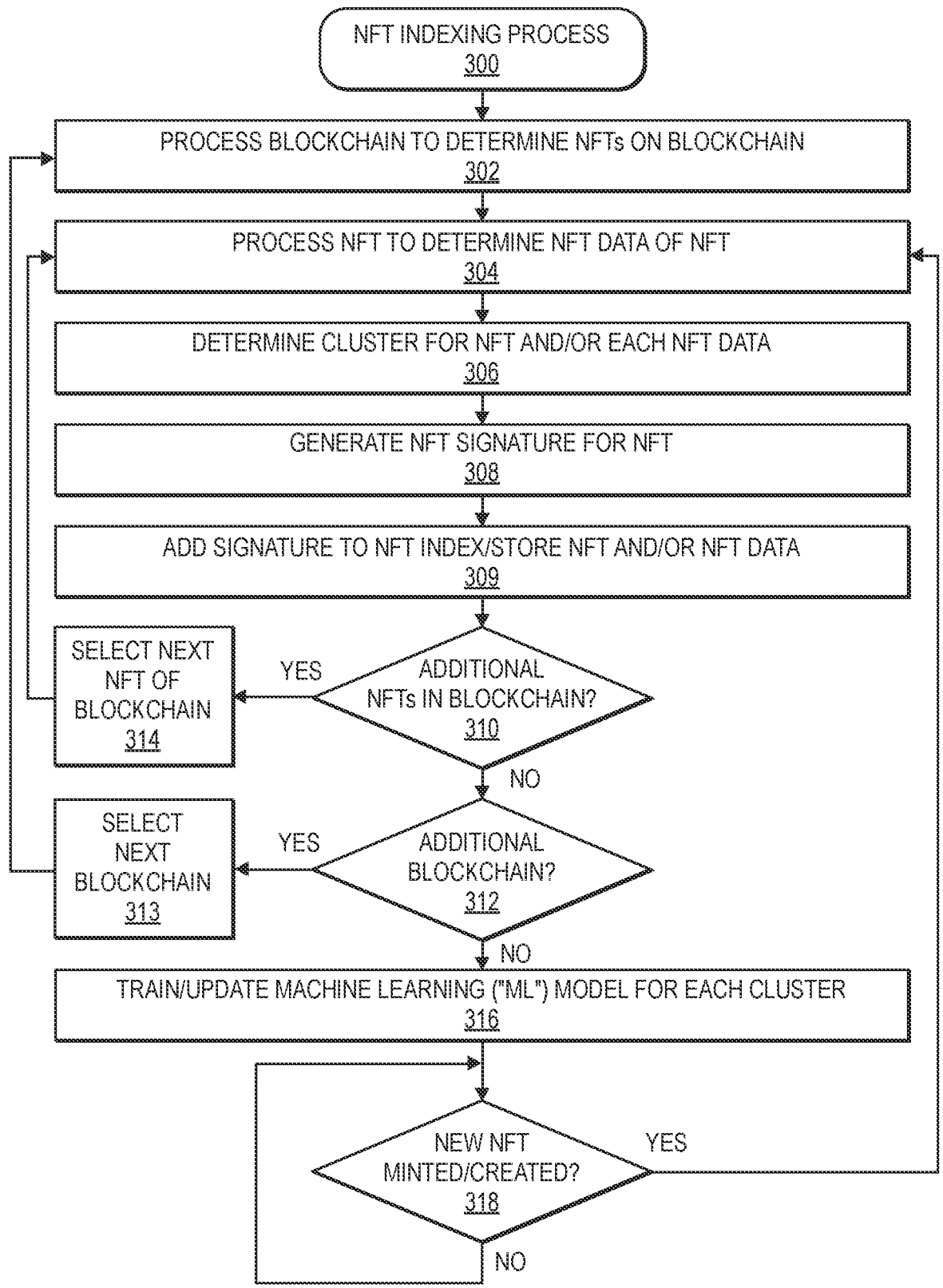
FIG. 3 is an example non-fungible token indexing process, in accordance with disclosed implementations.

FIG. 3 is an example non-fungible token indexing process 300, in accordance with disclosed implementations. The example process 300, which may be performed by the NFT authentication service, may be performed periodically (e.g., hourly, daily, weekly, etc.) or may be performed continuously.

The example process 300 begins by processing or crawling a blockchain to determine all NFTs that exist on the blockchain, as in 302. For an NFT determined to exist on the blockchain, the example process may process the NFT to determine one or more NFT data, such as a digital data, represented by or pointed to by the NFT, as in 304. In some examples, the NFT data may be included in the NFT and exist on the blockchain. In other examples, the NFT or the smart contract of the NFT may point to or otherwise reference the NFT data. For example, the NFT data represented by an NFT may be stored off the blockchain.

Clusters may then be determined for the NFT and/or for each NFT data of the NFT, as in 306. For example, as NFTs are processed, similar or like NFTs may be associated with a cluster, with different clusters formed for different types of NFTs. As an illustrative but non-limiting example, a first cluster may be formed for NFTs that represent a single digital image, a second cluster may be formed for NFTs that represent multiple digital images, a third cluster may be formed for NFTs that represent a digital image and a digital video, a fourth cluster may be formed for NFTs that represent a physical item, etc. In a similar manner, clusters may be formed for NFT data, with different clusters for different types of NFT data.

The example process 300 may also generate an NFT signature for the NFT, as in 308. In some implementations, the signature may be based on all or a portion of the NFT. For example, in some implementations the signature may be a hash, compression, qubits, etc., of the data represented by the NFT. In other examples, the signature may be based at least in part on the digital data represented by the NFT and some or all of the metadata and/or smart contract of the NFT. In still other examples, the signature may be based at least in part on all aspects of the NFT.

The NFT signature may then be added to an NFT index, as in 309. The NFT index may be a single index for all NFT signatures and all NFT data signatures or multiple indexes which may be used to index NFTs and NFT data separately, by cluster, etc. In addition, in some implementations, the NFT and/or NFT data may also be stored in one or more data stores. Optionally, an embedding vector representative of the NFT and/or NFT data may be generated and stored.

After an NFT of a blockchain is processed, a determination is made as to whether another NFT of the blockchain remains for processing, as in 310. If it is determined that another NFT of the blockchain remains for processing, the NFT is selected, as in block 314, and the example process 300 returns to block 304 and continues.

If it is determined that no additional NFTs remain for processing, a determination is made as to whether additional blockchains exist for which NFTs have not yet been determined and processed, as in 312. If it is determined that additional blockchains exists, a next blockchain is selected, as in 313, and the example process 300 returns to block 302 and continues. If it is determined that no additional blockchains remain for processing, a machine learning model is trained for each cluster of NFTs and/or NFT data, as in 316. Alternatively, if a machine learning model has already been trained for a cluster, the machine learning model may be updated with newly identified NFTs and/or NFT data.

Any type of machine learning model that may be trained to detect data items of a type associated with the NFT may be utilized. For example, a convolutional neural network ("CNN") may be trained to process image data to determine a similarity between an image data that is a candidate NFT data and image data of other existing NFTs. In other examples, other types of machine learning models may be trained. For example, a CNN may be trained for a cluster of a plurality of image data to generate a similarity score between an candidate image (e.g., an NFT data) and each image data of the cluster, the similarity scores indicative of similarities between the candidate image and the respective image data of the cluster.

The example process 300 may continue by determining if a new NFT has been created or minted on one of the blockchains, as in 318. If it is determined that no new NFT has been detected, the example process 300 remains at block 318 and continues to monitor the blockchains for new NFTs. However, if it is determined that a NFT has been created/minted on a blockchain, the example process 300 returns to block 304, processes the new NFT, and continues.

Figure 4:
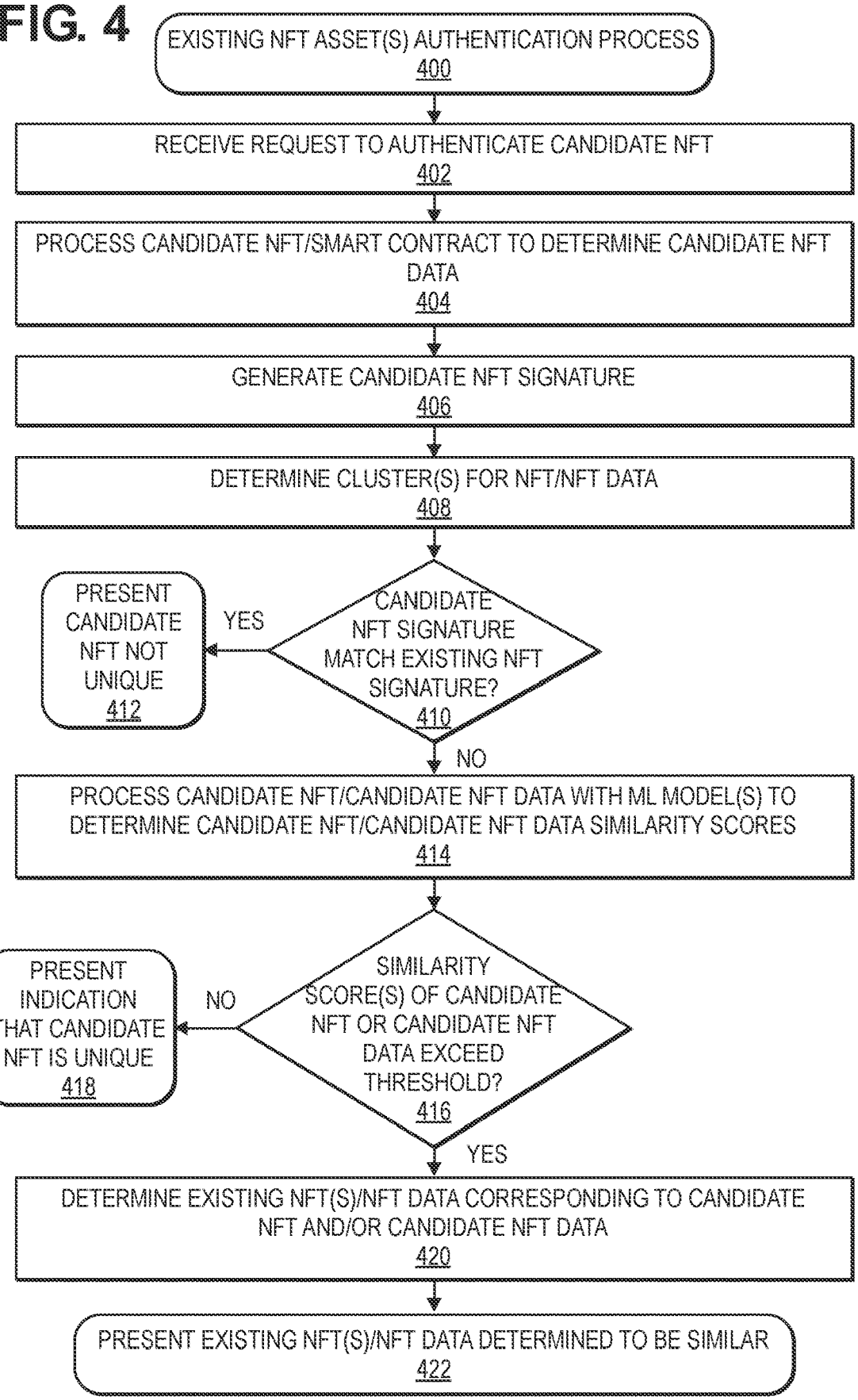
FIG. 4 is an example non-fungible token digital data authentication process, in accordance with disclosed implementations.

FIG. 4 is an example non-fungible token digital authentication process 400, in accordance with disclosed implementations.

The example process 400 begins upon receipt of a request to authenticate a candidate NFT, as in 402. In the example discussed with respect to FIG. 4, the candidate NFT is an existing NFT. Accordingly, the request to authenticate the candidate NFT may be part of a purchase/sale of the candidate NFT, a request by a user to authenticate a candidate NFT owned by the user, a request by a user to authenticate a candidate NFT owned by another user (e.g., the user may be considering a purchase of the candidate NFT), etc.

In response to a request to authenticate a candidate NFT, the NFT and corresponding smart contract are processed to determine each NFT data represented or pointed to by the candidate NFT, as in 404. As discussed above, in many instances NFTs may reference or point to NFT data that is stored off the blockchain. In such an example, the NFT data may be determined and accessed by the example process 400.

The example process 400 may then generate a candidate NFT signature of the candidate NFT, as in 406. In some implementations, the signature may be based at least in part on all or a portion of the candidate NFT and candidate NFT data. For example, in some implementations, the signature may be a hash, compression, qubits, etc., of the candidate NFT data represented by the candidate NFT. In other examples, the signature may be based at least in part on the candidate NFT data represented by the candidate NFT and some or all of the metadata and/or smart contract of the candidate NFT. In still other examples, the signature may be based on all aspects of the candidate NFT/candidate NFT data.

In addition, a cluster for the candidate NFT and/or each candidate NFT data may be determined, as in 408. As discussed above, as part of indexing, all NFTs existing on the blockchains, the existing NFTs and/or existing NFT data may be associated with a cluster, for example based on their type. In a similar manner, a candidate NFT may be processed to determine a type or cluster to which the candidate NFT is most similar or is to be associated. Alternatively, or in addition thereto, the candidate NFT data may be processed to determine a cluster(s) to which the candidate NFT data is to be associated.

A determination may then be made as to whether the candidate NFT signature generated at block 406 matches an NFT signature of an existing NFT, as in 410. In some implementations, the candidate NFT signature may be compared to NFT signatures of existing NFTs associated with the cluster determined for the candidate NFT. In other examples, the candidate NFT signature may be compared with NFT signatures for all NFTs indexed in accordance with the disclosed implementations.

If it is determined that the candidate NFT signature matches an existing NFT signature, the example process may return or present a notification that the candidate NFT is not unique, as in 412. For example, if the signatures generated for a candidate NFT and existing NFTs is based on a portion of the NFT, a duplicate NFT created on different blockchains may be detected based on a comparison of the NFT signatures.

If it is determined at decision block 410 that the candidate NFT signature does not match an existing NFT signature, the candidate NFT and/or candidate NFT data represented by the candidate NFT may be processed by machine learning models generated for the clusters to which the candidate NFT and/or candidate NFT data were determined to be associated in block 408, as in 414. Each machine learning model may be trained to process a candidate NFT/candidate NFT data and determine for each existing NFT/existing NFT data a similarity score indicating similarity between the candidate NFT/candidate NFT data and each existing NFT/ existing NFT data.

A determination may then be made as to whether the similarity score of a candidate NFT or candidate NFT data exceeds a threshold, as in 416. The threshold may be any type of threshold that may be used as an indicator of similarity and may vary for different users, different candidate NFTs, different candidate NFT data, different existing NFTs, different existing NFT data, etc. Likewise, as discussed below, in some implementations, a user may adjust the threshold such that fewer or additional NFTs and/or NFT data may be determined as similar to a candidate NFT/ candidate NFT data.

If it is determined that the similarity scores do not exceed the threshold, an indication may be presented indicating that the candidate NFT is unique, as in 418. However, if it is determined that a similarity score exceeds the threshold, the existing NFT and/or existing NFT data that resulted in the uniqueness score being below the threshold is determined, as in 420. Finally, the existing NFT that is determined to be similar or that represents the NFT data that is determined to be similar, may be presented to the user as similar to the candidate NFT, as in 422.

Figure 5:
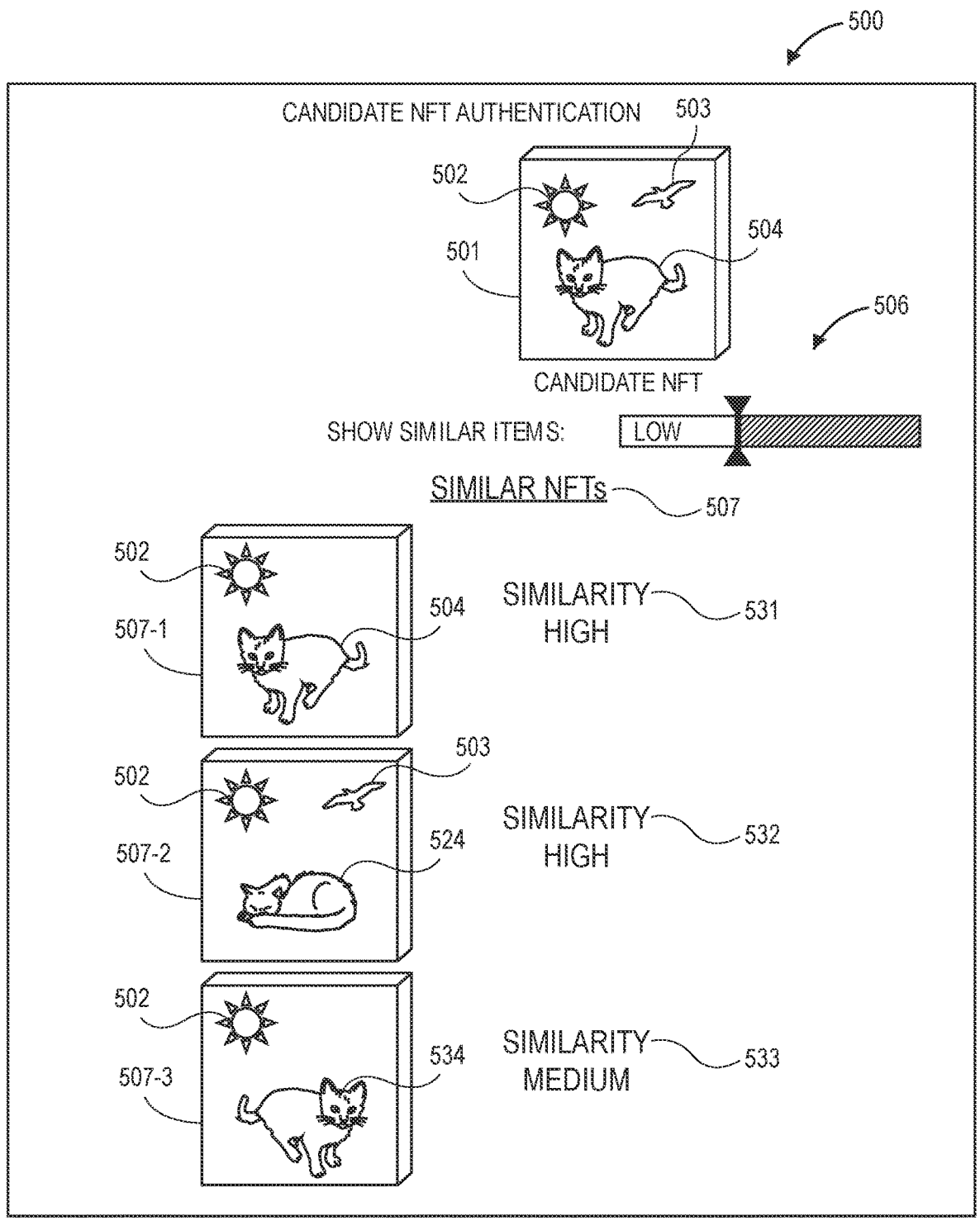
FIG. 5 is an example illustration of a non-fungible token authentication user interface, in accordance with disclosed implementations.

FIG. 5 is an example illustration of a non-fungible token authentication user interface 500, in accordance with disclosed implementations.

The example user interface 500 may be presented as a result of the example process 400 (FIG. 4) indicating existing NFTs 507 determined to be similar to a candidate NFT 501.

In the illustrated example, the candidate NFT 501 may be processed to determine that it represents three different NFT data, in this example, cat image data 504, bird image data 503, and sun image data 502. Accordingly, each of the candidate NFT 501 and candidate NFT data 502, 503, 504 may be processed and it may be determined that existing NFTs 507-1, 507-2, and 507-3 each result in a similarity score of the candidate NFT exceeding a threshold (i.e., the existing NFTs and/or existing NFT data of the existing NFTs are determined to be similar to the candidate NFT and/or candidate NFT data). In this example, it is determined that existing NFT 507-1 is highly similar 531 to the candidate NFT because existing NFT 507-1 includes NFT data of the sun image data 502 and the cat image data 504. Likewise, it is determined that existing NFT 507-2 is highly similar 532 to candidate NFT 501 because it includes NFT data of the sun image data 502 and the bird image data 503. In addition, even though the cat image data 524 of the existing NFT 507-2 is different than the cat image data 504 represented by the candidate NFT, the cat image data 524 is determined to be visually similar to the cat image data 504 of the candidate NFT 501.

Finally, it is determined that the existing NFT 507-3 has a medium similarity 533 to the candidate NFT 501 because the existing NFT 507-3 includes the same sun image data 502 as the candidate NFT 501 and also includes an NFT data of the cat image data 534 that, while different than the cat image data 504 of the candidate NFT 501, is visually similar.

In the illustrated example, the user may select, in this example through a slider 506, the sensitivity in determining and viewing existing NFTs that are determined to be similar to the candidate NFT. In the illustrated example, the slider is set such that the user can view existing NFTs determined to have a high or medium similarity to the candidate NFTs. If the user selects to adjust the slider 506 to the right, the user may view only existing NFT that are determined to be highly similar to the candidate NFT. Alternatively, the user may move the slider to the left to view existing NFTs that are determined to have a low similarity, a medium similarity, or a high similarity. As a result, a user may make informed decisions regarding the candidate NFT.

The above user interface 500 is just one example of a user interface for candidate NFT authentication that may be provided as part of the example process 500 (FIG. 5). It will be appreciated that any form of notification or user interface may be utilized with the disclosed implementations.

Figure 6:
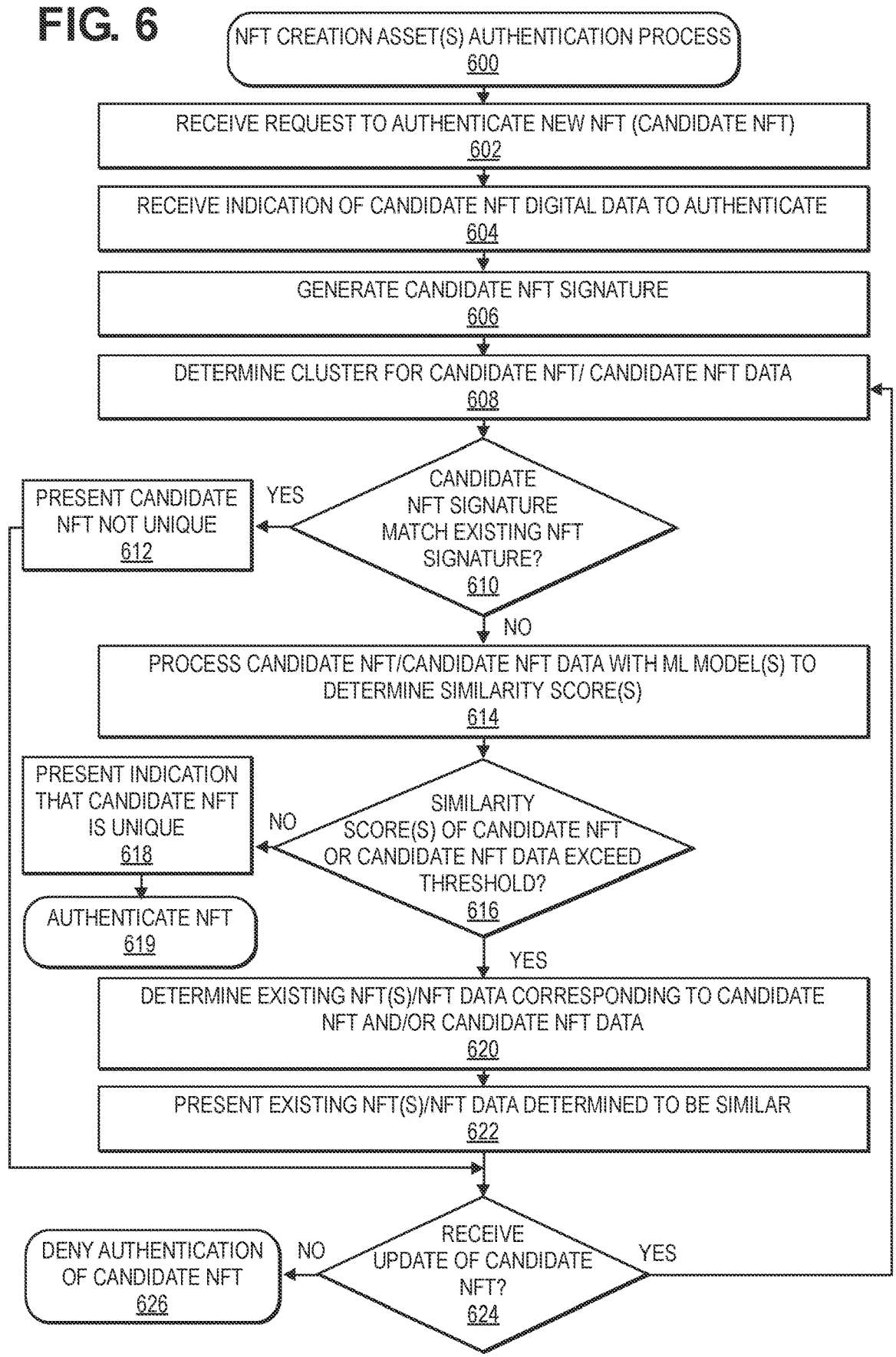
FIG. 6 is an example non-fungible token creation authentication process, in accordance with the disclosed implementations.

FIG. 6 is an example non-fungible token creation authentication process 600, in accordance with the disclosed implementations.

The example process 600 begins upon receipt of a request to authenticate a new candidate NFT, as in 602. In the example discussed with respect to FIG. 6, the candidate NFT is a new NFT or one that is in the process of being created/minted. For example, a user that is creating an NFT on a blockchain may proactively request that the NFT the user is creating be authenticated as original. As illustrated below, in some implementations, an authenticated NFT may be indicated to other users as already having been processed and determined to be authentic, thereby providing additional assurances to other potential users or buyers as to the origin of the NFT and/or the NFT data of the NFT.

In addition to receiving the request to authenticate a new candidate NFT, candidate NFT data of the candidate NFT is also received, as in 604. For example, the user that requested the authentication may provide the candidate NFT data to the example process 600 and/or provide locations (e.g., uniform resource locator "URL") indicating a location of the candidate NFT data.

The example process 600 may then generate a candidate NFT signature of the candidate NFT, as in 606. In some implementations, the signature may be based at least in part on all or a portion of the candidate NFT that is being created. For example, in some implementations, the signature may be a hash, compression, qubits, etc., of the data to be represented by the candidate NFT. In other examples, the signature may be based at least in part on the data to be represented by the candidate NFT and some or all of the metadata and/or smart contract of the candidate NFT that is to be created. In still other examples, the signature may be based on all aspects of the candidate NFT that is to be created.

In addition, a cluster for the candidate NFT and/or each candidate NFT data may be determined, as in 608. As discussed above, as part of indexing all NFTs existing on the blockchains, the existing NFTs and/or existing NFT data may be associated with different clusters, for example based on their type. In a similar manner, a candidate NFT may be processed to determine a type or cluster to which the candidate NFT is most similar or is to be associated. Alternatively, or in addition thereto, the candidate NFT data may be processed to determine a cluster(s) to which the candidate NFT data is to be associated.

A determination may then be made as to whether the candidate NFT signature generated at block 606 matches an NFT signature of an existing NFT, as in 610. In some implementations, the candidate NFT signature may be compared to NFT signatures of existing NFTs associated with the cluster determined for the candidate NFT. In other examples, the candidate NFT signature may be compared with NFT signatures for all NFTs indexed in accordance with the disclosed implementations.

If it is determined that the candidate NFT signature matches an existing NFT signature, the example process may return or present a notification that the candidate NFT is not unique, as in 612. For example, if the signatures generated for a candidate NFT to be created and existing NFTs is based on a portion of the NFTs, a duplicate NFT that is attempting to be created on a different blockchain may be detected as a duplicate based on a comparison of the NFT signatures. In implementations in which the example process 600 is included as part of NFT creation/minting, the creation may not be allowed to proceed if it is determined that the NFT is not unique. In other examples, the notification may be presented to the user or another entity but the NFT creation process may proceed independently of the example process 600. For example, as discussed below with respect to FIG. 8, in some implementations, digital data may be monitored for a user to determine if an NFT is being created that includes the monitored digital data. In such an example, if the candidate NFT includes candidate NFT data that corresponds to a monitored digital data, the user for which the monitored digital data is being monitored may be notified.

If it is determined at decision block 610 that the candidate NFT signature does not match an existing NFT signature, the candidate NFT and/or candidate NFT data represented by the candidate NFT may be processed by machine learning models generated for the clusters to which the candidate NFT and/or candidate NFT data were determined to be associated in block 608, as in 614. Each machine learning model may be trained to process a candidate NFT/candidate NFT data and determine for each existing NFT/existing NFT data a similarity score indicating similarity between the candidate NFT/candidate NFT data and each existing NFT/existing NFT data.

A determination may then be made as to whether a similarity score of a candidate NFT or candidate NFT data exceeds a threshold, as in 616. The threshold may be any type of threshold that may be used as an indicator of similarity and may vary for different users, different candidate NFTs, different candidate NFT data, different existing NFTs, different existing NFT data, etc.

If it is determined that the similarity scores do not exceed the threshold, an indication may be presented indicating that the candidate NFT is unique, as in 618, and the NFT may be authenticated, as in 619. As discussed below, in some implementations, an indicator or other identifier may be associated with a candidate NFT to illustrate that the candidate NFT has been processed in accordance with the disclosed implementations and determined to be unique.

If it is determined that a similarity score does exceed the threshold, the existing NFT and/or existing NFT data that resulted in the similarity score exceeding the threshold is determined, as in 620. In addition, the existing NFT that is determined to be similar or that represents the NFT data that is determined to be similar, may be presented to the user as similar to the candidate NFT, as in 622.

After presenting to the user the indication that a similar NFT has been determined (block 622) or after presenting to the user an indication that the candidate NFT is not unique (block 612) a determination is made as to whether an update to the candidate NFT that is being created has been made, as in 624. Because the example process 600 may be performed with respect to an NFT that is in the process of being created, the candidate NFT and/or candidate NFT data may still be changed before creation/minting of the NFT is performed.

If it is determined that an update to the candidate NFT has been received, the example process 600 returns to block 608 and continues with respect to the updated candidate NFT/updated candidate NFT data. If it is determined that an update to the candidate NFT has not been received, authentication of the candidate NFT is denied, as in 626, and the example process 600 completes. In implementations in which the example process 600 is included as part of NFT creation/minting, the creation of the NFT may not be allowed to proceed if authentication of the NFT is denied. In other examples, the notification may be presented to the user or another entity but the NFT creation process may proceed independently of the example process 600. For example, as discussed below with respect to FIG. 8, in some implementations, digital data may be monitored for a user to determine if an NFT is being created that includes the monitored digital data. In such an example, if the candidate NFT includes candidate NFT data that corresponds to a monitored digital data, the user for which the monitored digital data is being monitored may be notified.

Figure 7A:
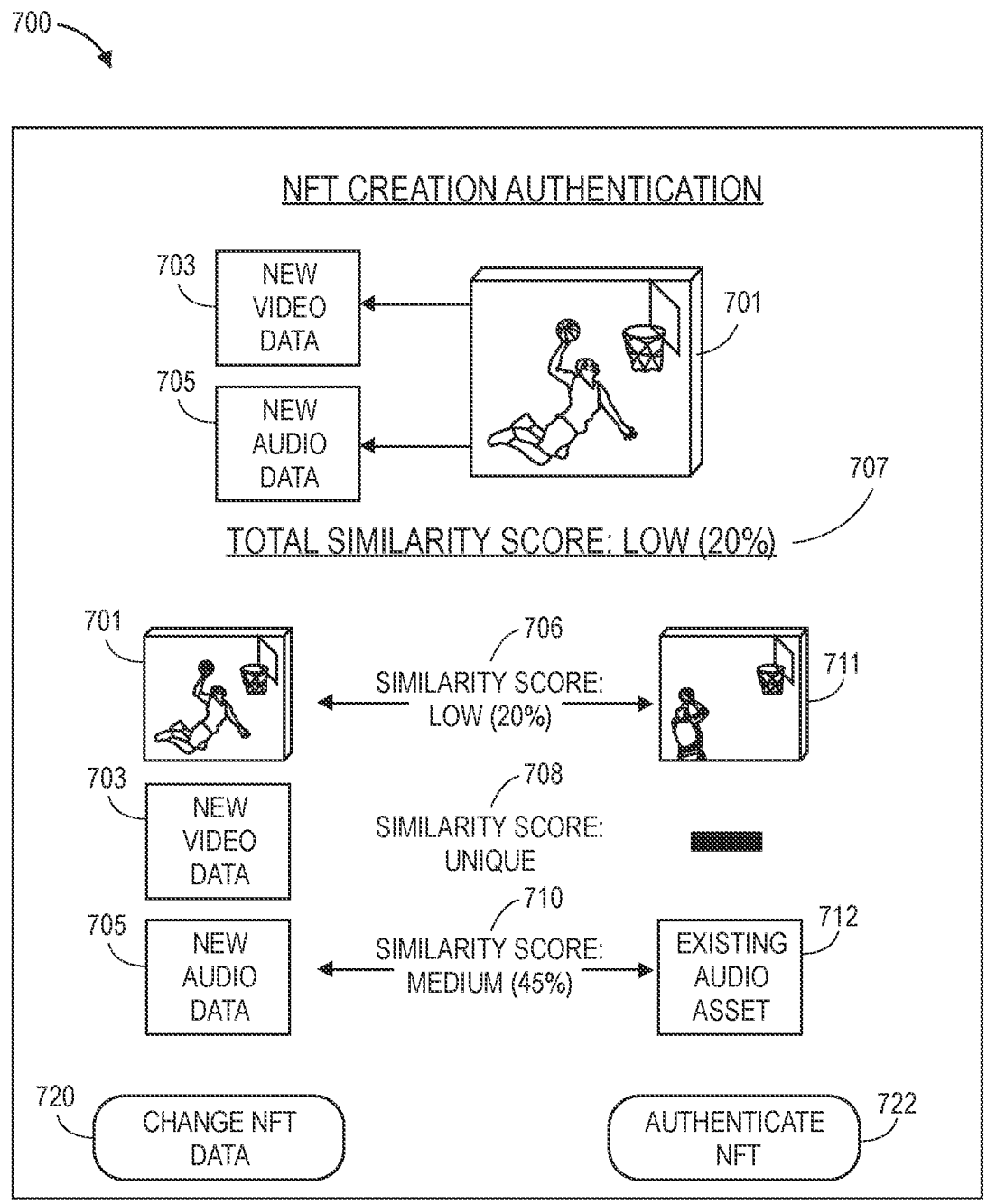
FIG. 7A is an example illustration of non-fungible token creation authentication user interface, in accordance with the disclosed implementations.

FIG. 7A is an example illustration of a non-fungible token creation authentication user interface 700, in accordance with the disclosed implementations. The user interface 700 may be presented to a user as part of the example process 600 (FIG. 6) to indicate to the user the results of the processing performed with respect to a new candidate NFT 701 for which the user has requested authentication.

In the illustrated example, a user is in the process of creating a new NFT shown as a candidate NFT 701, that includes as candidate NFT data a new video data 703 and a new audio data 705. The example process 600 (FIG. 6) may process the candidate NFT and candidate NFT data as discussed above and determine a similarity score 707 between the candidate NFT and/or candidate NFT data. In the illustrated example, it is determined that the candidate NFT 701 has a low similarity score 706, in this example 20%, to another existing NFT 711, that the candidate NFT data of the new video data 703 is unique 708 (i.e., no similar video data was determined), and that the candidate NFT data of the new audio data 705 has a medium similarity score 710, in this example 45%, to another existing audio data 712.

While the example describes determining similarity of the NFT and NFT data based on a similarity score, with a low similarity score indicating the NFT/NFT data is more unique than a high similarity score, in other implementations, other scoring structures may be used. For example, a uniqueness score may be determined, with higher scores indicating a higher uniqueness than a lower score.

The user may view the results of the candidate NFT creation authentication request and optionally select to change one or more candidate NFT data by selecting the change NFT data control 720 or, in this example, because it was determined that the NFT 701 has a low similarity to other existing NFTs, the user may select to authenticate the NFT through selection of the Authenticate NFT control 722 and proceed with creation of the candidate NFT.

Figure 7B:
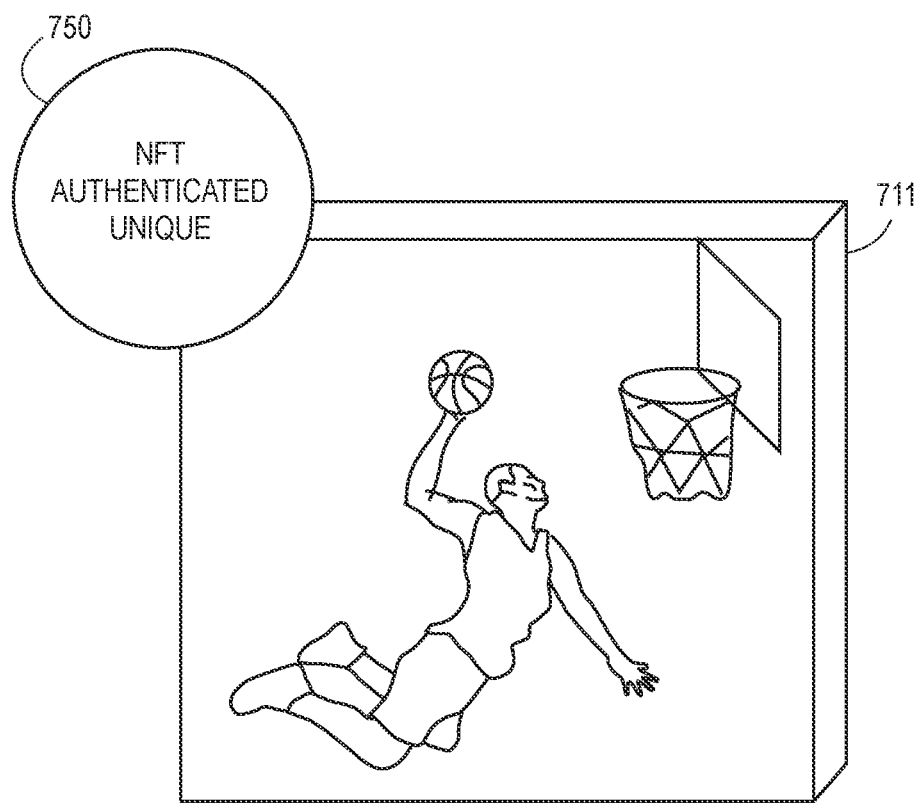
FIG. 7B is an example illustration of a non-fungible token that includes an indicator that the non-fungible token has been authenticated as unique, in accordance with disclosed implementations.

Referring now to FIG. 7B and continuing with the example, if the user selects to authenticate the NFT and continues with creation of the NFT, in some implementations, an indicator 750 or other identifier may be associated with the NFT and viewable or otherwise determinable by other users to inform other uses that the NFT has been authenticated in accordance with the disclosed implementations. In the example illustrated with respect to FIG. 7B, the resulting NFT 711 may be presented to users with the indicator 750 indicating that the NFT has been determined to be unique and authorized in accordance with the described implementations. Such information provides additional confidence to users that the NFT and/or NFT data represented by the NFT is unique.

While the above examples have been discussed with respect to authenticating a candidate NFT, either a candidate NFT that is already an existing NFT or a candidate NFT that is an NFT in the process of being created, with respect to other existing NFTs and existing NFT data, in other implementations, a candidate NFT and/or candidate NFT data may be compared to other data beyond existing NFTs and/or existing NFT data. For example, in some implementations, NFT data, such as image data, may be compared to a larger index, data store, or clusters of data to determine if the NFT data is unique. For example, the disclosed implementations may determine a data type of a candidate NFT data and compare that NFT data to all other accessible data of that same type. As an illustrative example, if the NFT data is a digital image, the disclosed implementations may compare the NFT data (the digital image) to all other accessible digital image, such as all digital images on the Internet, or a subset of digital images, etc., to determine a uniqueness of the NFT data.

The above user interface 700 and indicator 750 are just one example of a user interface and indicator that may be provided as part of the example process 600 (FIG. 6). It will be appreciated that any form of notification, user interface, indicator may be utilized with the disclosed implementations.

Figure 8:
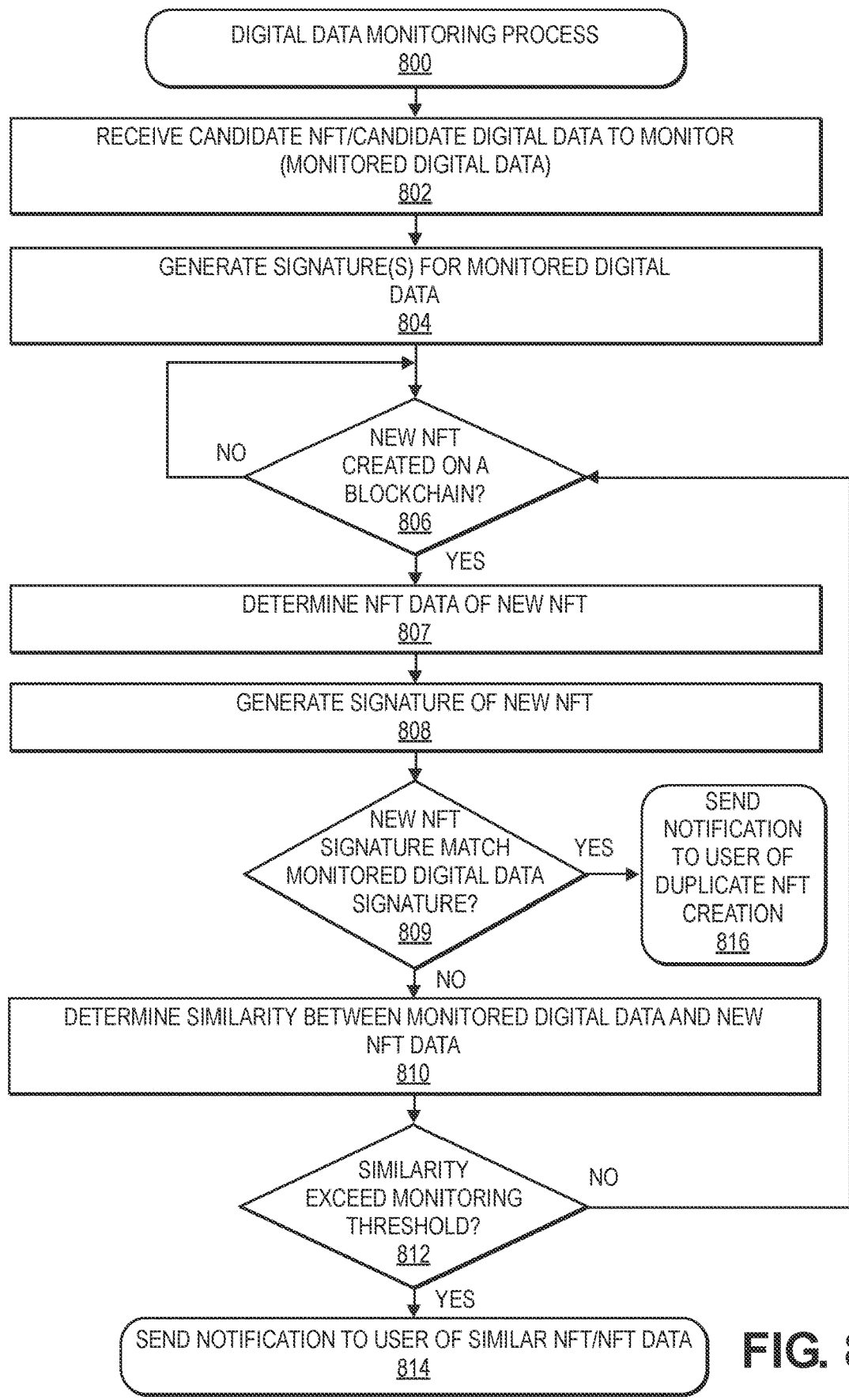
FIG. 8 is an example of a digital data monitoring process, in accordance with the disclosed implementations.

FIG. 8 is an example a digital data monitoring process 800, in accordance with the disclosed implementations. The example process may be used to monitor any form of digital data that may potentially be represented as an NFT and/or a digital data that is represented as an NFT.

The example process 800 begins by receiving an indication of a candidate NFT(s) and/or candidate digital data to monitor, referred to herein generally as a monitored digital data, as in 802. For example, a user may upload a plurality of digital data to a data store, social networking site, etc., and provide a link or point to the plurality of digital data, each of which may then be considered a monitored digital data.

For each monitored digital data, a signature representative of the monitored digital data is generated (a monitored digital data signature), as in 804. For example, a hash value of each monitored digital data may be generated and utilized as the monitored digital data signature. As discussed above, the hash value may be a hash of the entire monitored digital data or a portion of the monitored digital data.

To monitor the digital data, a determination is made as to whether a new NFT has been created/or minted on a blockchain, as in 806. In some implementations, the example process may be included in the NFT creation process and thus the determination may be made before the NFT is fully created (i.e., as part of the minting process). In other examples, the example process 800 may be performed independent of the NFT minting process, periodically or continually monitoring blockchains to determine new NFTs that are created on a blockchain.

If it is determined that a new NFT has not been created, the example process 800 remains at decision block 806 and continues monitoring for a new NFT on the blockchains. However, if it is determined that a new NFT has been created on a blockchain, or is in the process of being created, NFT data of the new NFT is determined, as in 807. As discussed above, an NFT may represent or point to NFT data that resides off the blockchain. As such, the new NFT or the corresponding smart contract of the new NFT may be processed to determine the location of the NFT data of the new NFT.

A signature of the new NFT is also generated, as in 808. For example, a signature in the form of a hash value that hashes the same aspects of the new NFT as was used to hash the monitored digital data may be performed to generate a new NFT signature.

A determination may then be made as to whether the new NFT signature matches a monitored digital data signature, as in 809. If it is determined that the new NFT signature matches a monitored digital data signature, a notification may be sent to the user that requested monitoring of the digital data/NFT(s), as in 816. Any form of notification may be sent or presented to the user. For example, a user interface such as the user interface illustrated and discussed below with respect to FIG. 9 may be sent or presented to the user. In other examples, a text message, voice message, or other form of notification may be provided to the user.

Returning to decision block 809, if it is determined that the new NFT signature does not match a monitored digital data signature, a similarity between the monitored digital data and the new NFT data may be determined, as in 810. For example, each NFT data of the new NFT may be processed to determine a cluster to which the NFT data is to be associated and the NFT data processed by a trained machine learning model corresponding to that cluster. The trained machine learning model may produce a similarity score for each monitored digital data of that cluster, the similarity score indicative of a similarity between the monitored digital data and the new NFT data. In another example, a machine learning model may be trained based on the monitored digital data. In such an example, cluster determination may be omitted and each new NFT data processed by the trained machine learning model to determine a similarity between the new NFT data and each monitored digital data. In still other examples, a machine learning model may be omitted and one or more algorithms, such as an image processing algorithm, audio processing algorithm, etc., may be selected based on a type of the monitored digital data and the type of the new NFT data and used to determine a similarity between the monitored digital data and the new NFT data.

Based on the similarity scores determined for each monitored digital data, a determination is made as to whether any of the similarity scores exceed a monitoring threshold, as in 812. The monitoring threshold may be any value or indicator to determine if a new NFT data is similar to a monitored digital data and may vary for different users, different monitored digital data, etc.

If it is determined that the similarity scores do not exceed the monitoring threshold, it is determined that the new NFT does not include or represent any of the monitored digital data and the example process 800 returns to block 806 and continues monitoring for a next NFT to be created on a blockchain. In comparison, if it is determined that a similarity score exceeds the monitoring threshold, a notification may be sent to the user that requested the monitoring indicating that a new NFT is or has been created that includes an NFT data that is similar to a monitored digital data, as in 814. Any form of notification may be sent or presented to the user. For example, a user interface such as the user interface illustrated and discussed below with respect to FIG. 9 may be sent or presented to the user. In other examples, a text message, voice message, or other form of notification may be provided to the user.

Figure 9:
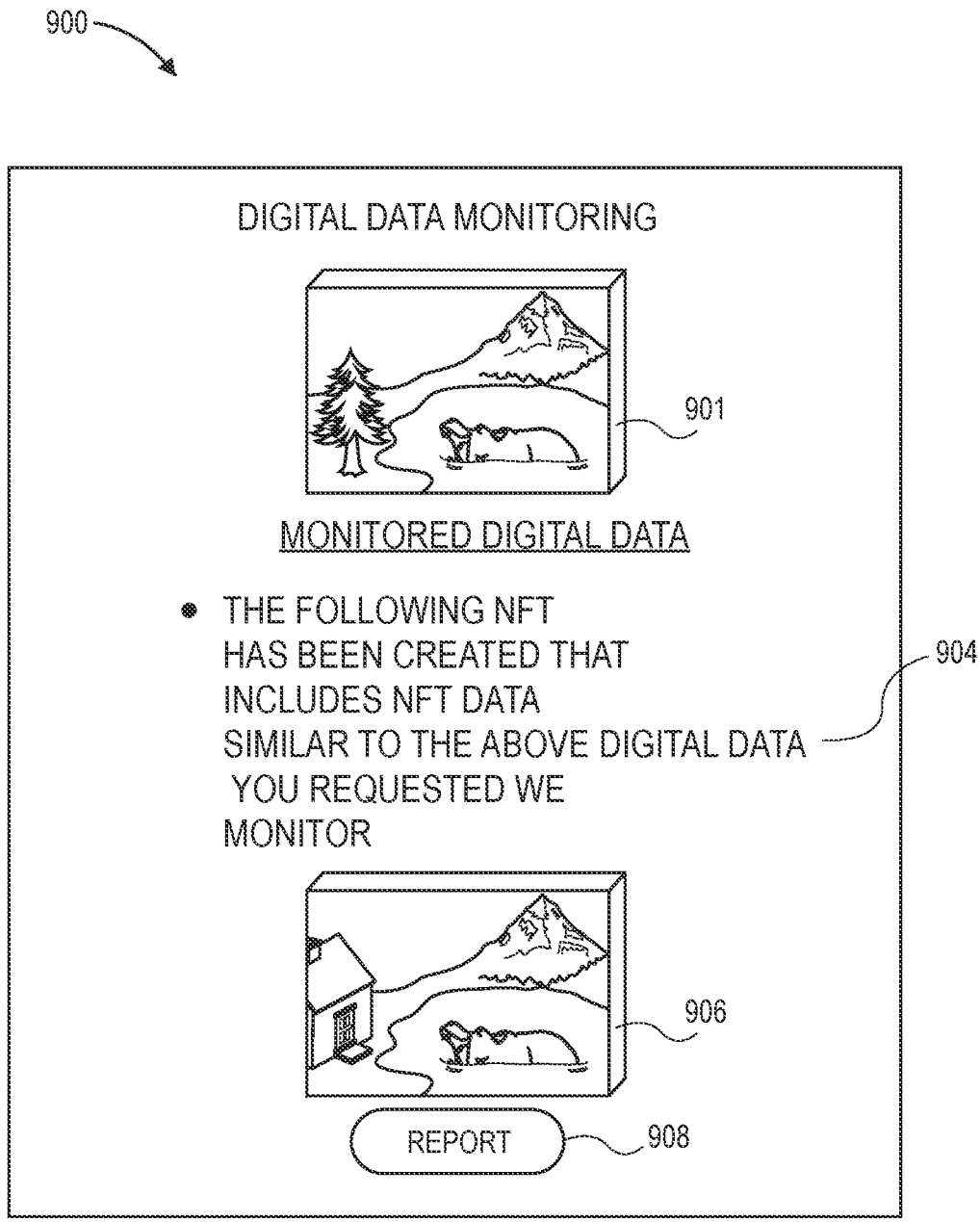
FIG. 9 is an example illustration of a digital data monitoring user interface, in accordance with disclosed implementations.

FIG. 9 is an example illustration of a digital data monitoring user interface 900, in accordance with disclosed implementations.

As discussed above, the user interface 900 may be provided or sent to a user that requested monitoring of one or more digital data and/or NFTs upon determination that a new NFT is or has been created on a blockchain that matches or includes a monitored digital data.

In the illustrated example user interface 900, a user has requested that a digital image that includes a representation of a hippopotamus in a lake next to a tree with a mountain in the background be monitored as a monitored digital data 901. The monitored digital data 901 may be an NFT that represents NFT data of a digital image, or a digital image stored in a memory, but is not represented by an NFT.

As part of the monitoring process (FIG. 8), it is determined that a new NFT 906 is or has been created that includes NFT data that is similar to the monitored digital data 901. In this example, the user interface 900 includes a textual notification 904 describing the basis for the notification along with a representation of both the monitored digital data 901 and the new NFT 906 determined to be similar or include a NFT data that is determined to be similar to the monitored digital data 901. With the information presented in the user interface 900 as a notification, a user viewing the user interface may determine if the new NFT does indeed include a monitored digital data or not. In addition, in some implementations, the user may select to report the NFT is not being authentic or including a digital data owned or controlled by the user by selecting the Report control 908. In such an example, an indicator or other representation may be associated with the new NFT that includes an indication that the NFT may include a monitored digital data of another user.

In instances in which the monitoring process 800 (FIG. 8) is included as part of an NFT creation/minting process, if it is determined that the new NFT does indeed include a digital data (new NFT data) of another user, the creation of the NFT may be prohibited, unless the user of that new NFT data is authorized by the user to utilize the digital data in the new NFT.

The above user interface 900 is just one example of a notification that may be provided upon a determination by the example monitoring process 800 (FIG. 8) that a new NFT and/or a new NFT data is similar to a monitored digital data. It will be appreciated that any form of notification may be utilized with the disclosed implementations.

Figure 10:
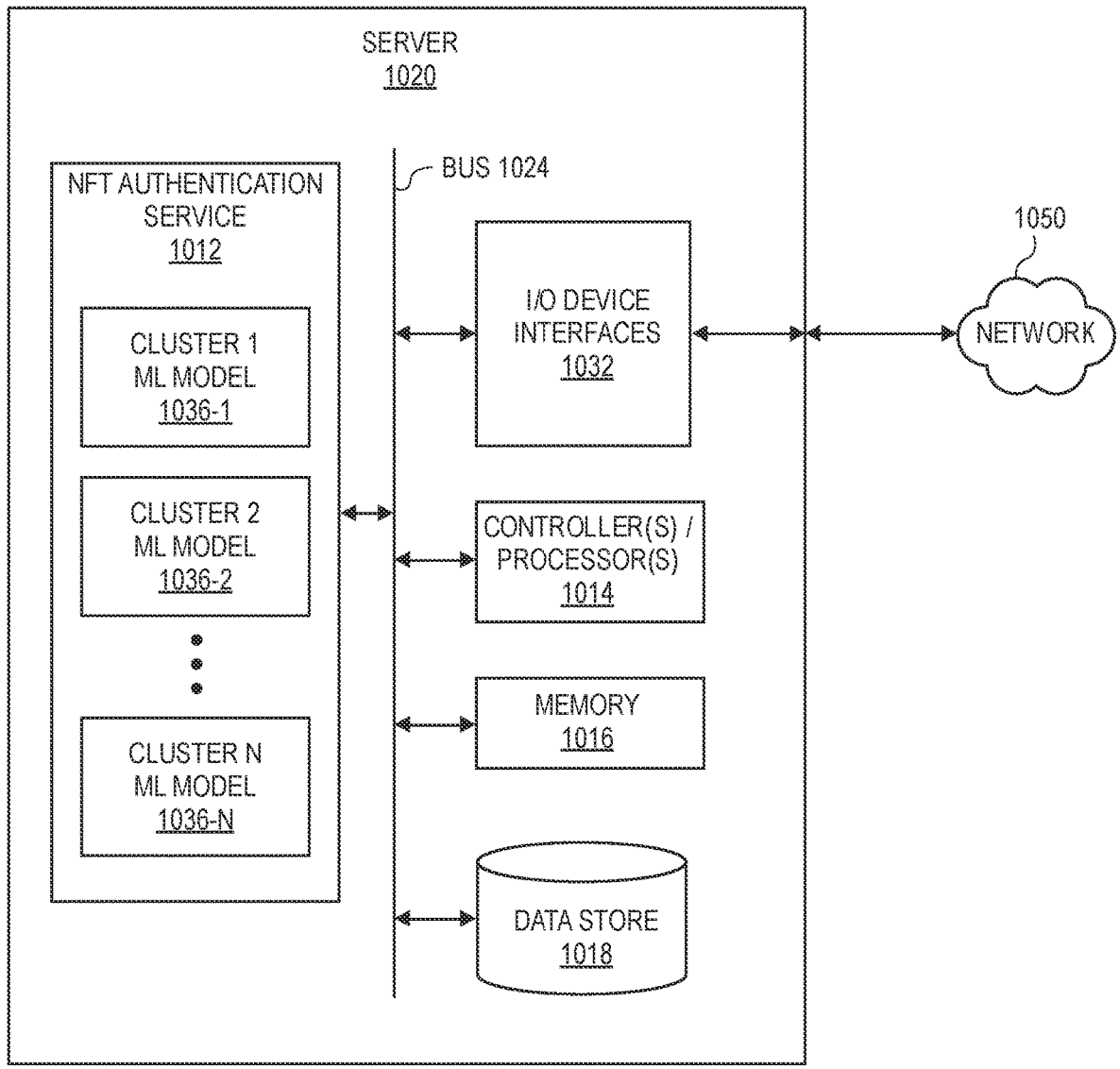
FIG. 10 illustrates example components of a server, in accordance with disclosed implementations.

FIG. 10 is a block diagram conceptually illustrating example components of a remote computing device, such as a remote server 1020 that may include and/or execute an NFT authentication service 1012 and/or perform the implementations described herein. Multiple such servers 1020 may be included in the system.

Each of these server(s) 1020 may include one or more controllers/processors 1014, that may each include a central processing unit (CPU) for processing data and computer-readable instructions, and a memory 1016 for storing data and instructions. The memory 1016 may individually include volatile random access memory (RAM), non-volatile read only memory (ROM), non-volatile magnetoresistive (MRAM) and/or other types of memory. Each server may also include a data storage component 1018, for storing data, controller/processor-executable instructions, NFT signatures, NFT data signatures, indexes, etc. Each data storage component may individually include one or more non-volatile storage types such as magnetic storage, optical storage, solid-state storage, etc. Each server may also be connected to removable or external non-volatile memory and/or storage (such as a removable memory card, memory key drive, networked storage, etc.), internal, and/or external networks 1050 (e.g., the Internet) through respective input/output device interfaces 1032.

Computer instructions for operating each server 1020 and its various components may be executed by the respective server's controller(s)/processor(s) 1014, using the memory 1016 as temporary "working" storage at runtime. A server's computer instructions may be stored in a non-transitory manner in non-volatile memory 1016, storage 1018, and/or an external device(s). Alternatively, some or all of the executable instructions may be embedded in hardware or firmware on the respective device in addition to or instead of software.

Each server 1020 includes input/output device interfaces 1032. A variety of components may be connected through the input/output device interfaces. Additionally, each server 1020 may include an address/data bus 1024 for conveying data among components of the respective server. Each component within a server 1020 may also be directly connected to other components in addition to (or instead of) being connected to other components across the bus 1024.

The NFT authentication service 1012, as discussed herein may generate indexes of NFTs existing on one or more blockchains, determine clusters for those NFTs and/or the corresponding NFT data, and train or include a cluster machine learning model 1036-1, 1036-2, through 1036-N for each respective cluster of NFTs/NFT data, as discussed above.

The components of the server(s) 1020, as illustrated in FIG. 10, are exemplary, and may be located as a stand-alone device or may be included, in whole or in part, as a component of a larger device or system.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Moreover, with respect to the one or more methods or processes of the present disclosure shown or described herein, including but not limited to the flow charts shown in FIGS. 3, 4, 6, and 8, orders in which such methods or processes are presented are not intended to be construed as any limitation on the claimed inventions, and any number of the method or process steps or boxes described herein can be combined in any order and/or in parallel to implement the methods or processes described herein. Likewise, some process steps may be omitted and/or other additional process steps may be added. Also, the drawings herein are not drawn to scale.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media. In addition, components of one or more of the modules and engines may be implemented in firmware or hardware.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly," or "substantially" as used herein, represent a value, amount, or characteristic close to the stated value, amount, or characteristic that still performs a desired function or achieves a desired result. For example, the terms "about," "approximately," "generally," "nearly," or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
    indexing a plurality of non-fungible tokens ("NFTs") existing across a plurality of blockchains to generate an NFT index corresponding to the plurality of NFTs, wherein each NFT of the plurality of NFTs is assigned to a respective owner, includes a unique identifier, and represents or points to other digital data;
    receiving, from a user, a request to authenticate a candidate NFT;
    in response to receiving the request:
        processing the candidate NFT to determine candidate NFT data of the candidate NFT;
        processing the candidate NFT data to generate a similarity score for the candidate NFT data, the similarity score indicative of a similarity of the candidate NFT data with respect to NFT data of the plurality of NFTs; and
        in response to determining that the similarity score exceeds a threshold, presenting the candidate NFT and a first NFT to the user indicating that the first NFT is determined to be similar to the candidate NFT.

2. The computer-implemented method of claim 1, further comprising:
    training a machine learning model, wherein training the machine learning model further includes:
        training, for each of a plurality of clusters, a machine learning model, each machine learning model trained to determine the similarity score between data included in a cluster and the candidate NFT data.

3. The computer-implemented method of claim 2, wherein processing the candidate NFT data includes:
    determining the cluster of the plurality of clusters to which the candidate NFT data corresponds; and wherein the machine learning model is trained for the cluster.

4. The computer-implemented method of claim 1, further comprising:
generating a candidate NFT signature of the candidate NFT; and
determining that the candidate NFT signature is unique when compared to signatures of each of the plurality of NFTs.

5. The computer-implemented method of claim 1, further comprising:
receiving a user request to monitor the NFT data, and wherein the indication includes at least: a message generated in response to the user request, the NFT data, and the candidate NFT.

6. The computer-implemented method of claim 1, wherein:
processing the candidate NFT data to generate the similarity score, further includes:
processing the candidate NFT data with at least one machine learning model of a plurality of machine learning models.

7. A computing system, comprising:
one or more processors; and
a memory storing program instructions that, when executed by the one or more processors, cause the one or more processors to at least:
index a plurality of non-fungible tokens ("NFTs") existing across one or more blockchains to generate an NFT index corresponding to the plurality of NFTs, wherein each NFT of the plurality of NFTs is assigned to a respective owner, includes a unique identifier, and represents or points to other digital data;
receive a request to authenticate an NFT;
in response to the request:
process the candidate NFT to determine candidate NFT data of the candidate NFT;
process the candidate NFT data to generate a similarity score for the candidate NFT data, the similarity score indicative of a similarity of the candidate NFT data with respect to NFT data of the plurality of NFTs; and
send, based at least in part on the similarity score, an indication that at least one of the NFT or the NFT data of the NFT are similar to the candidate NFT.

8. The computing system of claim 7, wherein the candidate NFT is at least one of a new NFT that has not yet been minted or an existing NFT.

9. The computing system of claim 7, wherein the program instructions that, when executed by the one or more processors to process the candidate NFT, further include instructions that, when executed by the one or more processors, further cause the one or more processors to at least:
process a smart contract associated with the candidate NFT to determine the NFT data, wherein the smart contract includes a link to the candidate NFT data that is stored in a first memory that is separate from a second memory that stores the candidate NFT.

10. The computing system of claim 7, wherein the program instructions that when executed by the one or more processors, further include instructions that cause the one or more processors to at least:
generate a signature corresponding to the candidate NFT; and
compare the signature with a plurality of existing signatures representative of the plurality of NFTs.

11. The computing system of claim 7, wherein the NFT data that is similar to the candidate NFT data includes at least still image data and one or more of video data or audio data.

12. The computing system of claim 7, wherein the program instructions that when executed by the one or more processors further include instructions that, when executed by the one or more processors, further cause the one or more processors to at least:
determine an owner of the NFT; and
send a notification to the owner of the NFT notifying the owner of an attempt to generate an NFT that is similar to the NFT.

13. The computing system of claim 7, wherein:
a first plurality of NFTs of the plurality of NFTs exist on a first blockchain; and
a second plurality of NFTs of the plurality of NFTs exist on a second blockchain.

14. The computing system of claim 7, wherein:
the program instructions that cause the one or more processors to process the candidate NFT data further include instructions that, when executed by the one or more processors, further cause the one or more processors to at least:
process, with at least one machine learning model of a plurality of machine learning models, the candidate NFT data to determine the NFT of the plurality of NFTs that includes the NFT data that is similar to at least one of the plurality of candidate NFT data.

15. The computing system of claim 7, wherein the program instructions when executed by the one or more processors, further cause the one or more processors to at least:
generate a candidate NFT signature of the candidate NFT; and
determine that the candidate NFT signature is unique when compared to signatures of each of the plurality of NFTs.

16. A method, comprising:
indexing of a plurality of non-fungible tokens ("NFTs") existing across one or more blockchains to generate an NFT index corresponding to the plurality of NFTs, wherein each NFT of the plurality of NFTs is assigned to a respective owner, includes a unique identifier, and represents or points to other digital data;
receiving a request to authenticate a candidate NFT;
in response to the request:
processing the candidate NFT to determine a candidate NFT data of the candidate NFT;
processing the candidate NFT data to generate a similarity score for the candidate NFT data, the similarity score indicative of a similarity of the candidate NFT data with respect to the first NFT of the plurality of NFTs; and
generating, based on the similarity score, a notification that the candidate NFT is similar to the first NFT.

17. The method of claim 16, wherein:
the first NFT is maintained on a first blockchain; and
a second NFT of the plurality of NFTs is maintained on a second blockchain that is different than the first blockchain.

18. The method of claim 16, further comprising:
generating a candidate NFT signature of the candidate NFT;
comparing the candidate NFT signature with signatures of each of the plurality of NFTs;
receiving an update to the candidate NFT to create an updated candidate NFT; and determining that the updated candidate NFT is unique from at least the first NFT.

19. The method of claim 18, wherein the signature is based at least in part on at least a portion of the candidate NFT.

20. The method of claim 16, wherein the candidate NFT is a new NFT that has not yet been minted.

* * * * *